United States Patent [19]
Sober

[11] 3,842,665
[45] Oct. 22, 1974

[54] PULSE PRESS TESTER
[75] Inventor: John V. Sober, Fort Walton Beach, Fla.
[73] Assignee: The United States of America as represented by the Secretary of the Air Force, Washington, D.C.
[22] Filed: Nov. 5, 1973
[21] Appl. No.: 412,855

[52] U.S. Cl. .................................... 73/93, 73/99
[51] Int. Cl. ............................................ G01n 3/30
[58] Field of Search........................... 73/93, 94, 99

[56] References Cited
UNITED STATES PATENTS
3,232,100  2/1966   Lindsey................................. 73/93
3,628,378  12/1971  Regan, Jr.............................. 73/93

Primary Examiner—Jerry W. Myracle
Attorney, Agent, or Firm—Harry A. Herbert, Jr.; Julian L. Siegel

[57] ABSTRACT

A pulse press testing apparatus in which a pressure vessel containing a propellant chamber is positioned adjacent to a force piston that acts upon a test specimen. Above the propellant chamber is a reaction piston which is movable into a back pressure chamber which contains one or more vents that can be adjusted to contour the shape of the pressure pulse. A pressure plate beneath the test specimen in the form of a rotary stepped incline plane applies torque for stress and strain tests and a concrete base is used as a seismic mass.

5 Claims, 1 Drawing Figure

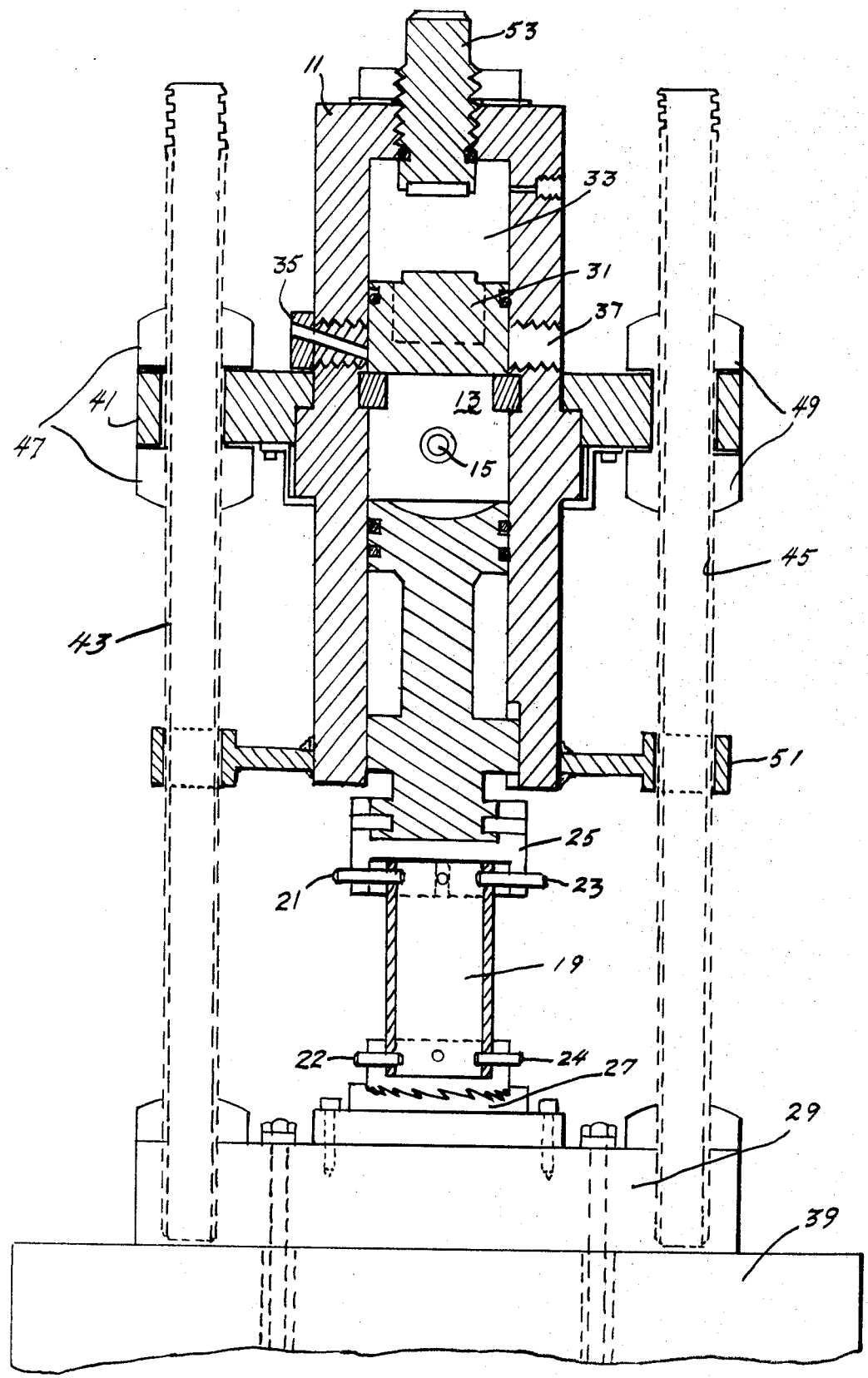

PULSE PRESS TESTER

BACKGROUND OF THE INVENTION

The present invention provides means to apply either compressive, tensile, torsional, or a combination of these to a test specimen. Unlike the ordinary force testing machines in common use, this machine has the unique ability of applying such forces in the millisecond time range and relieving the forces within milliseconds thereafter and the force can vary from zero to a million pounds or more. The invention is useful in the testing of artillery ammunition and for the study of the effects of gun launching under laboratory conditions.

SUMMARY OF THE INVENTION

Ignited propellant contained in a pressure vessel forces a piston to apply force to a test specimen and at the same time forces a second piston into a back pressure chamber. The intensity of the force can be controlled by controlling the back pressure in a chamber using vents that can be adjusted to contour the shape of the force pulse and using a reaction piston that moves into the back pressure chamber.

It is therefore an object of this invention to provide a force pulse testing machine in the million pound range that can apply and remove these large forces in approximately ten milliseconds total time duration.

It is another object to provide a force pulse testing machine having great flexibility in imparting any desired stress or strain conditions in a test apparatus.

It is still another object to provide a force pulse tester that can contour the force buildup and relief according to a desired curve or pulse shape.

It is still another object to provide a force pulse tester that adapts high energy conditions generated by moving a reaction weight and transforming the energy into heat.

These and other objects, features and advantages of the invention will become more apparent from the following description taken in connection with the illustrative embodiment in the accompanying drawing.

DESCRIPTION OF THE DRAWING

The sole FIGURE is a sectional view of the pulse press tester.

DETAILED DESCRIPTION OF THE PREFERRED EMBODIMENT

Referring to the sole drawing, there is shown pressure vessel 11 which could have approximately a 6-inch diameter bore and a wall thickness of three inches. Within this vessel there is enclosed propellant chamber 13 which contains a predetermined quantity of propellant. Port 15 in the surface of propellant chamber 15 is used for fill and priming. Immediately below propellant chamber 15 is force piston 17 which is acted upon by the propellant gas pressure in propellant chamber 15 so as to exert force upon test specimen 19 attached to the lower end of force piston 17. Locking pins 21–24 and specimen vise 25 or similar holding or locating devices are used to position test specimen 19 and to restrain various parts as desired in order to achieve certain stress and strain conditions.

Torsional stress is applied when desired by pressure plate 27 which is in the form of a circular stepped inclined plane acting as a rotary torque device. This creates the torsional stress and strain encountered by projectiles during angular acceleration in rifled gun barrels. Beneath pressure plate 27 is base anvil 29 serving as a base support.

Contouring of the force/time pulse is achieved by utilizing the system consisting of reaction piston 31, back pressure chamber 33, and controlled contour vent 35 as well as the main propellant vent 37. Additional contouring vents may also be included. The contouring is achieved by varying weight, density, and composition of the propellant fill which is inserted in propellant chamber 13 and the weight and diameter of reaction piston 31. Further control is achieved by varying the pressure and venting of the gas in back pressure chamber 31 and also the adjustment and venting characteristics of the contouring vents.

Concrete base 39 can be added which serves as a seismic mass to dissipate high shock forces encountered under high loading conditions. FIGURE.

Main support plate 41 supports the test fixture and transmits a portion of the reaction forces to vertical screw supports 43 and 45. In the preferred embodiment four such supports are used, although only two appear in the figure. These screw supports along with adjustment nuts 47 and 49 provide for accommodation of different test specimens by permitting the pressure vessel 11 to be vertically displaced along supports 43 and 45. Radial support arm 51 is a stabilizing member which also slides on vertical supports 43 and 45 and adjustable stop 53 is used to prevent inadvertent damage due to overtravel of reaction piston 31.

In operation the propellant gas pressure in propellant chamber 13 causes force piston 17 to act upon test specimen 19 with movement usually measured in thousandths of an inch. Any suitable measuring means can be used. The propellant pressure also acts upon reaction piston 31 whose movement is constrained to varying degrees by the inert gas pressure in back pressure chamber 33. As reaction piston 31 moves beyond a predetermined point, contour vents 35 are uncovered for a finite period of time. The propellant pressure is vented through contour vent 35 which can be an eccentrically angled hole or any other shape of opening. Much of the energy generated by the propellant gas is dissipated at the desired time in compressing the inert gas behind the reaction piston 31. This compressed gas can also be vented at any desired rate by contour vent 35.

What is claimed is:

1. An apparatus for a pulse press testing specimen comprising:
   a. a pressure vessel including therein a back pressure chamber and a propellant chamber;
   b. a reaction piston slidably contained in the pressure vessel at the base of the back pressure chamber and adjacent to the propellant chamber;
   c. a force piston slidably contained within the pressure vessel and in proximity to the propellant chamber at the opposite extreme of the reaction piston;
   d. means for securing the specimen in proximity to the force piston;
   e. a pressure plate in the form of a stepped incline plane positioned beneath the specimen; and
   f. a base anvil positioned under the pressure plate.

2. An apparatus for pulse press testing according to claim 1 further comprising means for controlling the pulse duration and pressure including a contouring vent in the pressure vessel in the vicinity of the reaction piston, the vent having an adjustment for changing the eccentricity thereof.

3. An apparatus for pulse press testing according to claim 2 which further comprises means for positionally adjusting for specimen sizes including:
   a. an upper horizontal circular plate attached to the pressure vessel;
   b. a lower horizontal circuit plate attached to the pressure vessel; and
   c. a plurality of vertical supports for slidably attaching the upper and lower horizontal circuit plates and having lower extremes embedded in the base anvil.

4. An apparatus for pulse testing a specimen according to claim 3 which further comprises a seismic mass in the form of a concrete base mounted beneath the base anvil.

5. An apparatus for pulse press testing according to claim 4 which further comprises means to avert overtravel of the reaction piston including an adjustable stop mounted at the top of the pressure vessel and screwably movable into the back pressure chamber.

* * * * *